United States Patent
Shimura et al.

(10) Patent No.: US 6,215,560 B1
(45) Date of Patent: Apr. 10, 2001

(54) IMAGE PROCESSING APPARATUS FOR PRODUCING HIGH RESOLUTION IMAGE DATA BASED ON A MEMORY AREA CAPACITY

(75) Inventors: Akihiro Shimura, Tokyo; Shigeru Ueda, Wako, both of (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/075,135

(22) Filed: May 11, 1998

(30) Foreign Application Priority Data

Jul. 13, 1990 (JP) .................................................. 2-184339

(51) Int. Cl.⁷ .................................................. G06K 15/00
(52) U.S. Cl. .......................................... 358/1.2; 382/299
(58) Field of Search .................... 395/102; 382/299–300, 382/264; 358/447, 451, 1.2, 1.9

(56) References Cited

U.S. PATENT DOCUMENTS

| | | | |
|---|---|---|---|
| 4,316,222 | 2/1982 | Subramaniam | 358/261.4 |
| 4,543,612 | 9/1985 | Matsunaga et al. | 358/261.4 |
| 5,033,106 | 7/1991 | Kita . | |
| 5,063,459 | 11/1991 | Nakatana et al. | 358/404 |
| 5,109,281 * | 4/1992 | Kobori et al. | 358/296 |
| 5,394,485 * | 2/1995 | Lowe et al. | 382/47 |
| 5,504,844 | 4/1996 | Ueda | 395/115 |
| 5,522,017 | 5/1996 | Ueda | 395/115 |

FOREIGN PATENT DOCUMENTS

| | | |
|---|---|---|
| 3931128 | 3/1990 | (DE) . |
| 12793 | 7/1980 | (EP) . |
| 0354791 * | 2/1990 | (EP) . |
| 354791 | 2/1990 | (EP) . |
| 389298 | 9/1990 | (EP) . |
| 2224187 * | 4/1990 | (GB) . |
| 2225468 | 5/1990 | (GB) . |
| 53-24146 | 2/1975 | (JP) . |

* cited by examiner

Primary Examiner—Thomas D. Lee
Assistant Examiner—Stephen Brinich
(74) Attorney, Agent, or Firm—Fitzpatrick, Cella, Harper & Scinto

(57) ABSTRACT

An image processing apparatus for outputting image data to a printing unit receives data input from an external unit, generates pixel image data in accordance with the input data, stores the pixel image data, converts the resolution of the pixel image data, and outputs the pixel image data whose resolution has been converted. In the apparatus the image data generating means determines the resolution of the pixel image data when it is stored in accordance with the memory capacity.

42 Claims, 3 Drawing Sheets

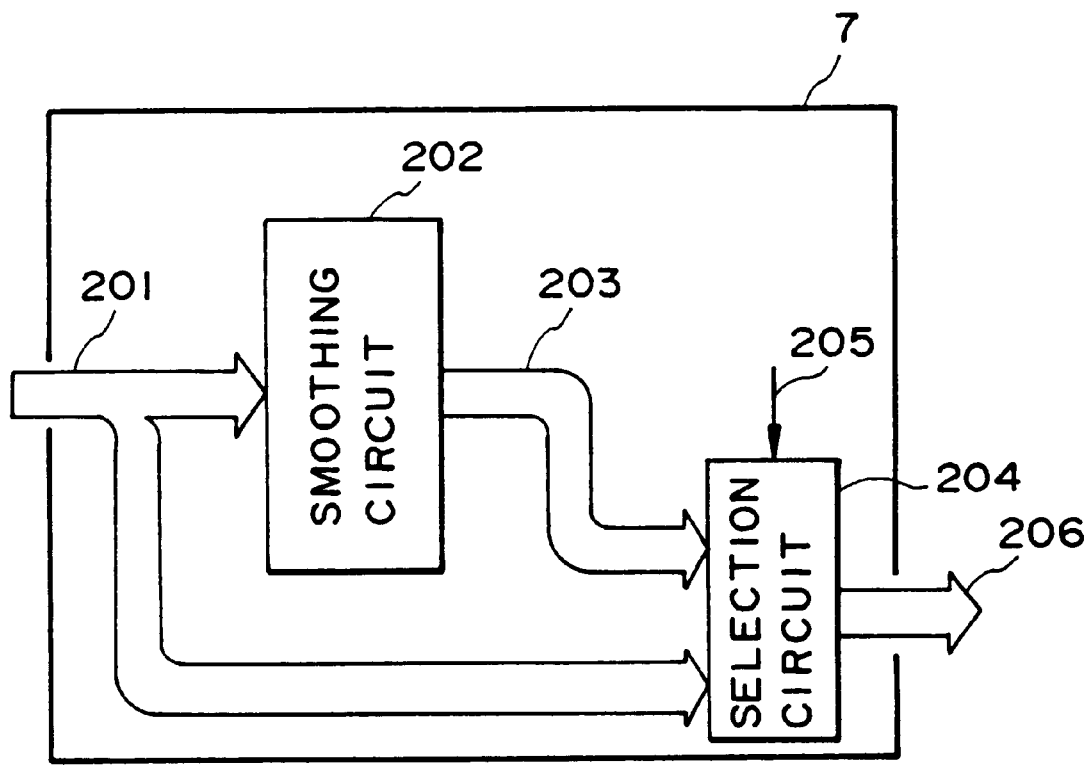
F I G. 2

IMAGE PROCESSING APPARATUS FOR PRODUCING HIGH RESOLUTION IMAGE DATA BASED ON A MEMORY AREA CAPACITY

BACKGROUND OF THE INVENTION

1. Field of the Invention

The invention relates to an image processing apparatus for processing image data to be printed by a printing unit.

2. Related Background Art

Generally, in a printing apparatus represented by a laser beam printer or the like, pixel image data according to a resolution of a print mechanism unit is produced in an image memory by an image processing apparatus and is printed by the print mechanism unit.

To hold a pixel image of an image of a predetermined mined size in the image memory, however, a memory area which is specified by the resolution of the printing apparatus is necessary. Therefore, for instance, in the case of outputting the image data to a printing apparatus of a high resolution, there is the drawback that a larger memory area is needed to keep a pixel image of an image of the same size as compared with the case of a printing apparatus of a low resolution. Such drawback is remarkable, particularly, in the case of using a color printing apparatus or the case of executing a gradation recording.

SUMMARY OF THE INVENTION

It is an object of the invention to provide an image processing apparatus which can avoid the above drawbacks.

Another object of the invention is to provide an image processing apparatus which receives code data such as a page description language or the like and can develop the image in a form according to a memory capacity.

Still another object of the invention is to provide an image processing apparatus in which, even if a printing apparatus of a high resolution or a high precision is connected, a high quality image according to the printing apparatus can be reproduced without increasing memory capacity.

The above and other objects, features, and advantages of the present invention will become apparent from the following detailed description with reference to the accompanying drawings.

BRIEF DESCRIPTION OF THE DRAWINGS

FIG. 2 is a detailed block diagram showing a construction of a conversion unit shown in FIG. 1.

DETAILED DESCRIPTION OF THE PREFERRED EMBODIMENT

The preferred embodiment according to the invention will be described in detail hereinbelow with reference to the drawings.

<Description of construction (FIGS. 1 and 2)>

Figure 1:
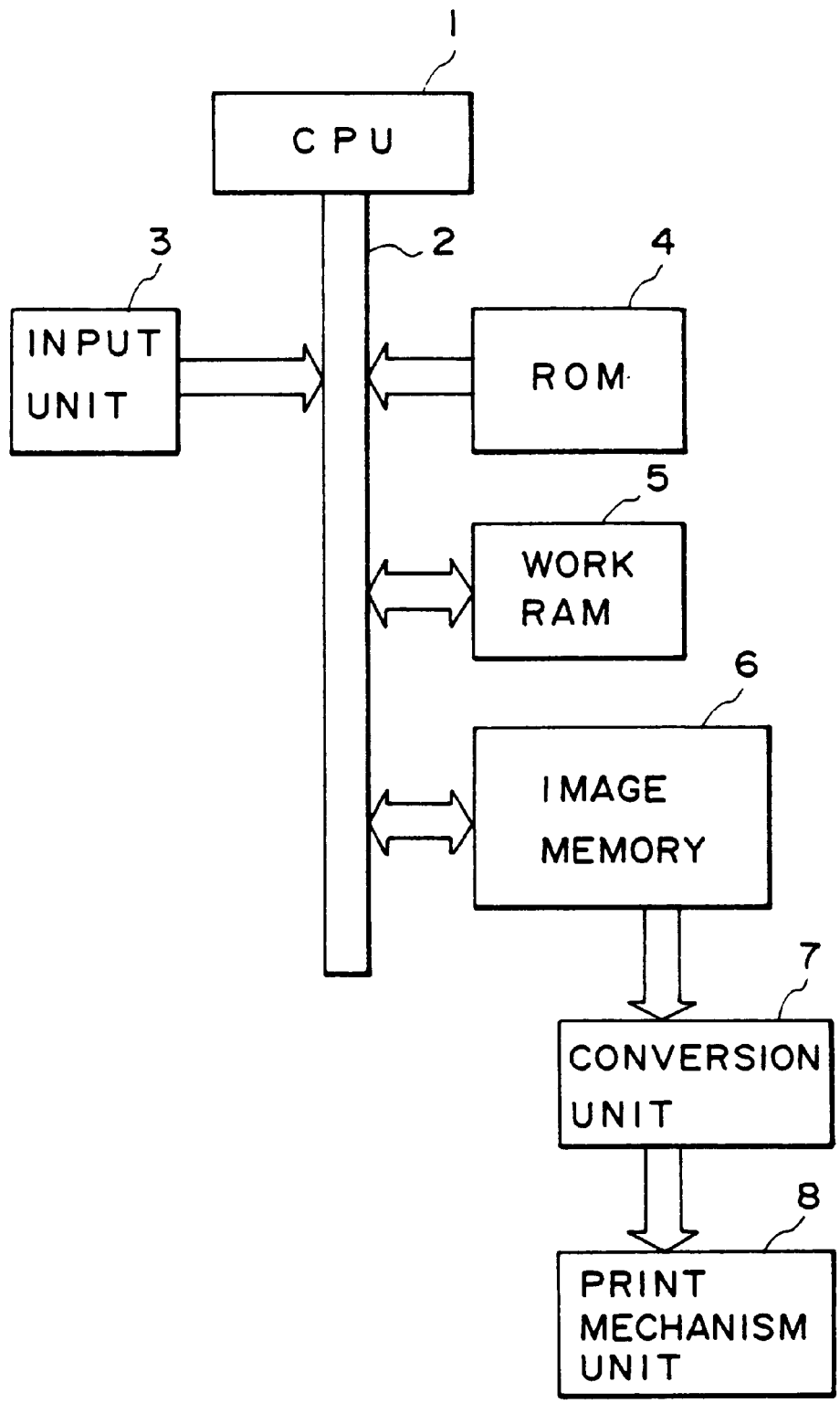
FIG. 1 is a schematic block diagram showing a construction of a printing apparatus according to an embodiment of the invention.

FIG. 1 is a schematic block diagram showing a construction of a printing apparatus according to the preferred embodiment. In the diagram, reference numeral 1 denotes a CPU to control the whole apparatus and 2 indicates a bus of the CPU 1. The bus 2 comprises an address bus, a data bus, and various control buses. Reference numeral 3 denotes an input unit for supplying input data which is given from a host computer or the like (not shown) to the printing apparatus and 4 indicates a ROM in which a program of the CPU 1, which will be explained hereinbelow, data, pattern data of characters, figures, and the like have been stored. The ROM 4 is not limited to any ROM but a memory having a function to store a program, data, and the like can also be used. A work RAM 5 is used as a work area of the CPU 1, a memory area for the data supplied from the input unit 3, and the like.

An image memory 6 is used in drawing a pixel image when pixel image data is to be produced. The capacity of the image memory 6 can be made variable. That is, the image memory 6 can be expanded. The work RAM 5 and the image memory 6 can be constructed physically of the same RAM and the capacity of an area which is used as an image memory 6 in such a RAM can be made variable, or a combination of both of them may also be used. Reference numeral 8 denotes a print mechanism unit in a printing apparatus such as a laser beam printer, ink jet printer, wire dot printer, or the like. The print mechanism unit 8 actually forms an image onto a paper or the like. The print mechanism unit 8 may have either a construction in which the density of pixels is variable or a construction in which an image can be printed by providing a gradation for every pixel. Or, the print mechanism unit 8 can also have a construction in which an image can be printed by providing a color tone for every pixel or a construction based on a combination of those constructions.

A conversion unit 7 converts the pixel image data produced in the image memory 6 into data having a resolution equal to the output resolution of the print mechanism unit 8 and supplies the results to the print mechanism unit 8. The conversion unit 7 does not perform the conversion when the resolution of the pixel image data produced in the image memory 6 coincides with the output resolution of the print mechanism unit 8.

A construction of the above conversion unit 7 will now be described with reference to a block diagram shown in FIG. 2.

The conversion unit 7 in the embodiment has two kinds of pixel image data producing means which can produce pixel image data whose pixel density is equal to 400 pixels per inch and the number of gradations per pixel is equal to 2 for the print mechanism unit 8 in which a pixel density is equal to 800 pixels per inch and the number of gradations per pixel is equal to 2, that is, which can produce a binary image and which can produce pixel image data at the same resolution as that of the print mechanism unit 8.

In FIG. 2, reference numeral 201 denotes pixel image data supplied from the image memory 6 and 202 indicates a smoothing circuit which is realized by a method disclosed in JP-B-53-24146 or the like. The smoothing circuit 202 executes an outline correction or the like on an image having a pixel density of 400 pixels/inch, converting it into an image having a pixel density of 800 pixels/inch. Reference numeral 203 denotes image data which has been converted by the smoothing circuit 202; 204 a selection circuit for selecting and outputting either the input pixel image 201 or the output 203 from the smoothing circuit 202 in accordance with a selection control signal 205, which will be explained hereinbelow. Reference numeral 205 denotes the selection control signal which is controlled by the CPU 1 and is used to control selection of one of the two inputs 201 and 203 by the selection circuit 204. Reference numeral 206 denotes output image data which is supplied from the selection circuit 204 to the print mechanism unit 8.

<Description of processing procedure (FIG. 3)>

Figure 3:
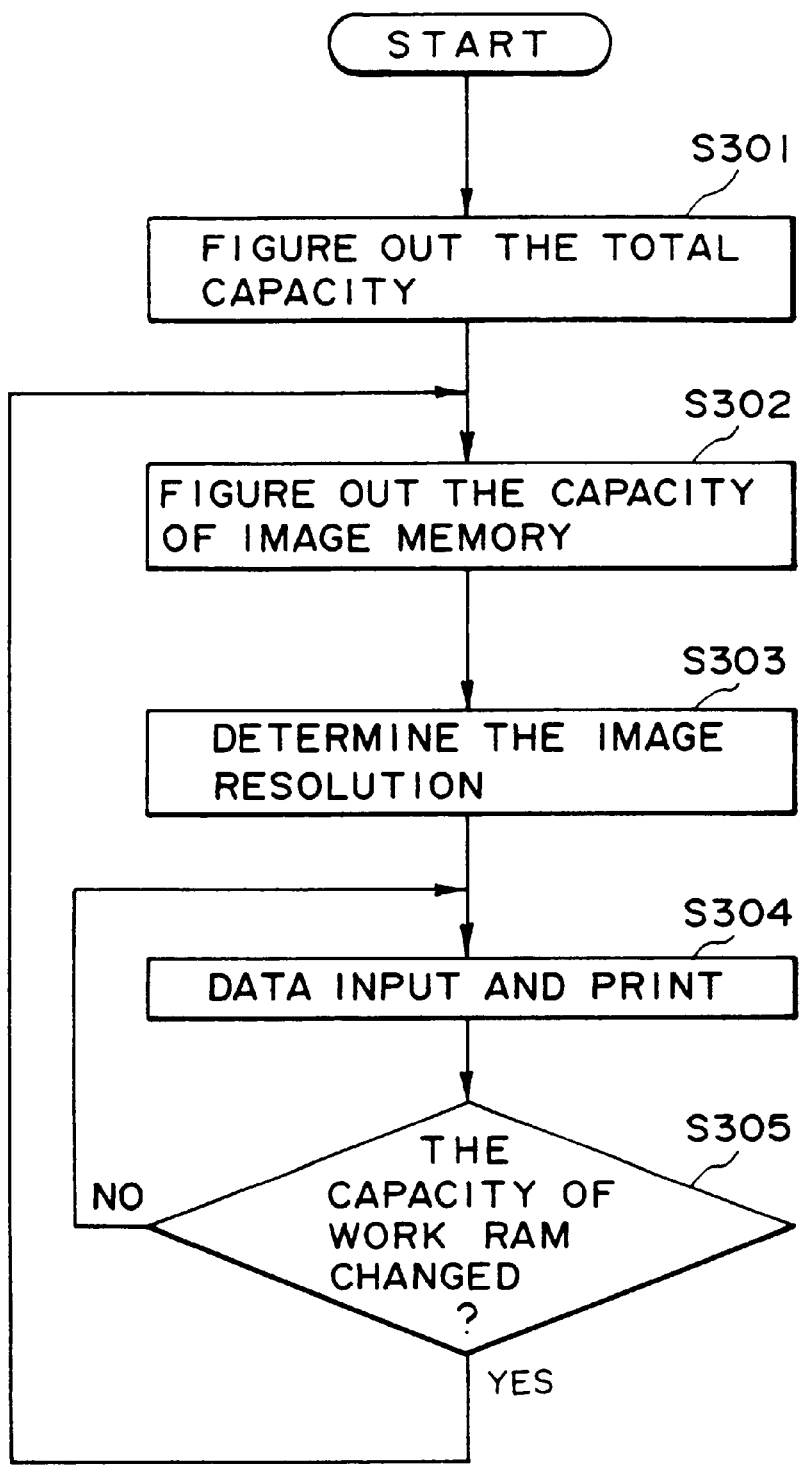
FIG. 3 is a flowchart showing a processing procedure in the embodiment of FIG. 1.

A processing procedure of the apparatus with the foregoing construction will now be described in accordance with a flowchart shown in FIG. 3.

In the preferred embodiment, the case where there is no physical difference between the work RAM 5 and the image memory 6 and those memories 5 and 6 are arranged in the same RAM will now be explained as an example.

In step S301, otal capacity of the RAM is calculated. For instance, if the total capacity of the RAM is fixed, it is sufficient to set the total capacity of the RAM to a fixed value. If the total capacity of the RAM is variable, the total capacity of the RAM is calculated on the basis of read/write tests of the RAM, a sense port of the total capacity of the RAM, a combination thereof, or the like. In the next step S302, capacity which can be used as an image memory 6, in the total capacity of the RAM obtained in step S301, is calculated. That is, the capacity which can be used as an image memory 6 is obtained by subtracting the capacity of the work RAM 5 which is necessary for the work at hand from the total capacity of the RAM.

In step S303, a resolution of an image to be generated is determined from the capacity of the image memory 6 obtained in step S302. For instance, if a memory capacity of one original of the A4 size (210 mm×297 mm) is the capacity of the image memory 6, the resolution of the output image is determined in accordance with the capacity of the image memory 6. That is, if the capacity of the image memory 6 is equal to or less than 7.4 Mbytes, the resolution of the output image is set to 400 pixels/inch. If the capacity is equal to or larger than 7.4 Mbytes, the resolution of the output image is set to 800 pixels/inch. In the next step S304, a pixel image for the image data supplied from the input unit 3 is produced in accordance with the resolution determined in step S303 and is developed in the image memory 6.

There is generated the selection control signal 205 to select the output 203 of the smoothing circuit 202 shown in FIG. 2 in the case where the resolution decided on step S303 is equal to 400 pixels/inch, or to select the input pixel image data 201 in the case where the resolution is equal to 800 pixels/inch. The pixel image data 206 selected by the selection control signal 205 is supplied to the print mechanism unit 8 and is printed.

After completion of the printing, in the next step S305, a check is made to see if the capacity of the work RAM has changed or not. Thus, for instance, if registration, deletion, or the like of a character pattern has been executed, the processing routine is returned to step S302 and the resolution is again determined. However, if the capacity is not changed, the processing routine is returned to step S304 and the above printing processes are repeated.

As described above, the resolution of the pixel image data to be produced is decided in accordance with the memory capacity which is assigned to the pixel image data and the pixel image data can be produced and printed at the resolution decided.

<Another embodiment>

The invention is not limited to the foregoing embodiment but various modifications are possible within the spirit and scope of the appended claims of the invention.

In the above embodiment, the resolution which is used has been set to 400 pixels/inch and 800 pixels/inch. However, the resolution to be used can be also set to other values and is not limited to just two values but can be set to a plurality of values. In this case, the apparatus is obviously changed in a manner such that a number of smoothing circuits and the like as shown in FIG. 2 equal to the number of resolutions which are used, is provided, and the outputs of the smoothing circuits are supplied to the selection circuit 204.

In the illustrated embodiment, the resolution of the print mechanism unit 8 has been fixed to 800 pixels/inch. However, the resolution can be also set to another different resolution. As a print mechanism unit 8, it is also possible to use a print mechanism unit in which paper feeding speed, sub-scanning speed, and the like are variable and which can print at a plurality of resolutions. In this case, the conversion unit 7 performs the storage or safekeeping and thinning-out of image data according to the set resolution in the print mechanism unit 8 and the drawing resolution in the image memory 6.

Even by the above modification, the resolution of the pixel image data to be produced is determined in accordance with the memory capacity which is assigned to the pixel image data, and the produced pixel image data can be printed.

Although the case where the image memory 6 is changed according to the capacity of the work RAM 5 has been described, the invention can be also applied to the case where the image memory 6 is made variable by expanding the memory.

The size of image memory 6 can be set by a command from an external host computer or by a dip switch or a panel switch, and the drawing resolution of the pixel image data in the image memory 6 can be also determined in accordance with the set size.

As described above, according to the invention, the pixel image data can be produced and printed at a high resolution in accordance with the capacity of the memory area.

The present invention is not limited to the foregoing embodiments but many modifications and variations are possible within the spirit and scope of the invention, as defined in the appended claims.

What is claimed is:

1. An image processing apparatus for outputting image data to a printing unit, comprising:

input means for inputting data from an external unit;

image data generating means for generating pixel image data in accordance with the input data;

memory means for storing the pixel image data;

resolution converting means for converting a resolution of the pixel image data; and output means for outputting the pixel image data whose resolution is converted by said resolution converting means, wherein the image data generating means determines the resolution of the pixel image data when it is stored into the memory means in accordance with a memory capacity of the memory means, and the resolution converting means determines the resolution of the pixel image data to be generated in a manner such that the resolution of the pixel image data which is output by the output means is set to be constant irrespective of the resolution of the pixel image data when the pixel image data is stored in the memory means.

2. An apparatus according to claim 1, wherein the memory capacity of the memory means is expanded.

3. An apparatus according to claim 1, wherein the resolution converting means changes the resolution of the pixel image data so as to be equal to a recording resolution of a printing unit to which the pixel image data is to be output by the output means.

4. An apparatus according to claim 1, wherein the input means receives code data from an external unit and the image data generating means has means for generating a pattern corresponding to the input code data.

5. An apparatus according to claim 1, wherein the resolution converting means executes a smoothing process when the interpolating process is performed.

6. An apparatus according to claim 1, further comprising a printing unit for performing printing on the basis of the pixel image data output from said output means.

7. A method of generating pixel image data which is printed by a printing unit, comprising the steps of:

inputting data from an external unit;

generating and outputting pixel image data whose resolution is determined based on a size of memory which is constructed so as to store the pixel image data; and converting, if necessary, the resolution of the pixel image data stored in the memory in a manner such that the resolution of the output pixel image data is independent on the resolution determined in the pixel image data generating step, wherein, in said resolution converting step, an interpolation process of the pixel image data is executed.

8. A method according to claim 7, wherein said resolution converting step includes a smoothing process.

9. A method according to claim 7, further comprising the step of performing printing on the basis of the pixel image data.

10. An image processing apparatus for outputting image data to a printing unit, comprising:

means for smoothing image data to convert a resolution thereof;

means for selecting one of the output of said smoothing means and unsmoothed image data in dependence upon a selection criterion related to available image storage space;

image data generating means for generating pixel image data in accordance with input image data;

memory means having the available image storage space for storing the pixel image data, and output means for outputting the pixel image data, wherein said image data generating means determines the resolution of the pixel image data in accordance with the available image storage space of said memory means, and said means for smoothing image data is adapted to change the resolution of the pixel image data so as to make it equal to a recording resolution of said output means.

11. An apparatus according to claim 10, wherein said means for smoothing is adapted to execute an interpolation process on the pixel image data.

12. An image processing apparatus for outputting image data to a printing unit, comprising:

input means for inputting data from an external unit;

image data generating means for generating pixel image data in accordance with the input data;

memory means for storing the pixel image data;

resolution converting means for converting a resolution of the pixel image data; and output means for outputting the pixel image data whose resolution is converted by said resolution converting means, wherein the image data generating means determines the resolution of the pixel image data when it is stored into the memory means in accordance with a memory capacity of the memory means, and the resolution converting means changes the resolution of the pixel image data by executing an interpolating process on the pixel image data.

13. An apparatus according to claim 12, wherein the memory capacity of the memory means is expanded.

14. An apparatus according to claim 12, wherein the input means receives code data from an external unit and the image data generating means has means for generating a pattern corresponding to the input code data.

15. An apparatus according to claim 12, wherein the resolution converting means executes a smoothing process when the interpolating process is performed.

16. An apparatus according to claim 12, further comprising a printing unit for performing printing on the basis of the pixel image data output from said output means.

17. A method of generating pixel image data which is printed by a printing unit, comprising the steps of:

inputting data from an external unit;

generating and outputting pixel image data whose resolution is determined based on a size of a memory which is constructed so as to store the pixel image data; and converting, if necessary, the resolution of the pixel image data stored in the memory in a manner such that the resolution of the output pixel image data is independent of the resolution determined in the pixel image data generating step, wherein said resolution converting step includes a smoothing process.

18. A method according to claim 17, further comprising the step of performing printing on the basis of the pixel image data.

19. An image processing apparatus comprising:

image data generating means for generating pixel image data in accordance with input image data;

memory means having a variable total capacity, said memory means having a work area, a capacity necessary for which is changed depending on current usage thereof, and an image memory area for storing the generated pixel image data;

converting means for converting a resolution of the pixel image data as stored in the image memory area to correspond to an output resolution of a printing unit;

means for outputting the pixel image data, the resolution of which is converted by said converting means, to the printing unit means for detecting the total capacity of said memory means;

means for obtaining the capacity necessary for the work area; and determining means for determining the resolution of the pixel image data in accordance with the detected total capacity of said memory means and the obtained capacity necessary for the work area.

20. An apparatus according to claim 19, wherein said determining means determines the resolution of the pixel image data on the basis of a difference between the detected total capacity of said memory means and the obtained capacity necessary for the work area.

21. An apparatus according to claim 19, wherein said converting means comprises means for smoothing image data and is adapted to change the resolution of the pixel image data so as to be equal to the recording resolution of the printing unit.

22. An apparatus according to claim 21, wherein the smoothing means is adapted to execute an interpolation process on the pixel image data.

23. An apparatus according to claim 21, further comprising means for selecting either the output of said smoothing means or unsmoothed image data in dependence upon the determination by said determining means.

24. An apparatus according to claim 19, wherein the variable total capacity of said memory means is scaleable to accept additional memory devices.

25. An image processing method for use with memory means having a variable total capacity, the memory means having a work area, a capacity necessary for which is changed depending on current usage thereof, and an image memory area for storing the generated pixel image data, the method comprising the steps of:
   generating pixel image data in accordance with input image data;
   converting a resolution of the pixel image data as stored in the image memory area to correspond to an output resolution of a printing unit; and
   outputting the pixel image data, the resolution of which is converted in said converting step, to the printing unit,
   wherein the step of generating pixel image data comprises the steps of
      detecting the total capacity of the memory means,
      obtaining the capacity necessary for the work area, and
      determining the resolution of the pixel image data in accordance with the detected total capacity of the memory means and the obtained capacity necessary for the work area.

26. A method according to claim 25, wherein the step of determining the resolution determines the resolution of the pixel image data on the basis of a difference between the determined total capacity of the memory means and the obtained capacity necessary for the work area.

27. A method according to claim 25, wherein the step of converting comprises the step of smoothing image data and is adapted to change the resolution of the pixel image data so as to be equal to the recording resolution of the printing unit.

28. A method according to claim 27, wherein the step of smoothing includes the step of executing an interpolation process on the pixel image data.

29. A method according to claim 27, further comprising the step of selecting either image data that has been smoothed in said smoothing step or unsmoothed image data, depending upon a result of the determining step.

30. A method according to claim 25, further comprising the step of increasing the variable total capacity of the memory means by adding additional memory devices.

31. An image processing apparatus comprising:
   image data generating means for generating pixel image data in accordance with input image data;
   memory means having a work area and an image memory area, the image memory area being adapted to store the generated pixel image data and having a variable storage capacity which depends on the current usage of the work area; and
   converting means for converting a resolution of the pixel image data as stored in the image memory area to correspond to an output resolution of a printing unit,
   wherein said image data generating means comprises means for obtaining the available memory capacity of said memory means, means for specifying the current memory capacity of the work area, and determining means for determining the resolution of the pixel image data on the basis of the memory capacity of said memory means and the current memory capacity of the work area.

32. An apparatus according to claim 31, wherein said converting means comprises means for smoothing image data and is adapted to change the resolution of the pixel image data so as to be equal to the recording resolution of the printing unit.

33. An apparatus according to claim 32, wherein the smoothing means is adapted to execute an interpolation process on the pixel image data.

34. An apparatus according to claim 32, further comprising means for selecting either the output of said smoothing means or unsmoothed image data in dependence upon the determination by said determining means as image data to be outputted to the printing unit.

35. An apparatus according to claim 31, wherein the memory capacity of said memory means is scaleable to accept additional memory devices.

36. An image processing method for use with memory means having a work area and an image memory area, the image memory area being adapted to store generated pixel image data and having a variable storage capacity which depends on the current usage of the work area, the method comprising the steps of:
   generating pixel image data in accordance with input image data; and
   converting a resolution of the pixel image data as stored in the image memory area to correspond to an output resolution of a printing unit,
   wherein the steps of generating pixel image data comprises the steps of
      obtaining the available memory capacity of the memory means,
      specifying the current memory capacity of the work area, and
      determining the resolution of the pixel image data on the basis of the memory capacity of the memory means and the current memory capacity of the work area.

37. A method according to claim 36, wherein the step of converting comprises the step of smoothing image data and is adapted to change the resolution of the pixel image data so as to be equal to the recording resolution of the printing unit.

38. A method according to claim 37, wherein the step of smoothing includes the step of executing an interpolation process on the pixel image data.

39. An apparatus according to claim 37, further comprising the step of selecting either image data that has been smoothed in said smoothing step or unsmoothed image data as image data to be outputted to the printing unit, depending upon a result of the determining step.

40. A method according to claim 36, further comprising the step of increasing the memory capacity of the memory means by adding additional memory devices.

41. An apparatus according to claim 31, further comprising means for selecting one of the pixel image data stored in said memory means and the pixel image data of the resolution converted by said converting means as image data to be outputted to the printing unit on the basis of the resolution determined by said determining means.

42. A method according to claim 36, further comprising a step of selecting one of the pixel image data generated in said generating step and the pixel image data of the resolution converted in said converting step as image data to be outputted to the printing unit on the basis of the resolution determined in said determining step.

* * * * *

UNITED STATES PATENT AND TRADEMARK OFFICE
CERTIFICATE OF CORRECTION

PATENT NO.   : 6,215,560 B1
DATED        : April 10, 2001
INVENTOR(S)  : Shimura et al.

It is certified that error appears in the above-identified patent and that said Letters Patent is hereby corrected as shown below:

Column 2,
Line 7, "ROM" should read -- ROM, --; and
Line 22, "onto" should read -- on --.

Column 3,
Line 9, "otal" should read -- total --;
Line 26, "of" (first occurrence) should read -- required for --;
Line 38, "on" should read -- on in --; and
Line 63, "be also" should read -- also be --, and "values" should read -- values, --.

Column 4,
Line 1, "are" should read -- is --; and
Lines 5, 21, and 27, "be also" should read -- also be --.

Column 5,
Line 39, "data, and output" should read -- data; and ¶ output --.

Column 7,
Line 21, "of" should read -- of: --.

Column 8,
Line 29, "of" should read -- of: --.

Signed and Sealed this

Eighth Day of January, 2002

*Attest:*

*Attesting Officer*

JAMES E. ROGAN
*Director of the United States Patent and Trademark Office*

UNITED STATES PATENT AND TRADEMARK OFFICE
CERTIFICATE OF CORRECTION

PATENT NO.     : 6,215,560 B1
DATED          : April 10, 2001
INVENTOR(S)    : Shimura et al.

It is certified that error appears in the above-identified patent and that said Letters Patent is hereby corrected as shown below:

<u>Title page,</u>
Below Item [22] Filed: May 11, 1998, insert:

-- [63] Related U.S. Application Data

Continuation of Serial No. 07/866,295, April 13, 1992, abandoned, which is a continuation of 07/728,265, July 11, 1991, abandoned. --

<u>Column 1,</u>
Line 5, insert the following paragraph:

-- This application is a continuation of Application Serial No. 07/866,295, filed April 13, 1992, now abandoned, which was a continuation of Application Serial No. 07/728,265, filed July 11, 1991, now abandoned. --

Signed and Sealed this

Fourth Day of June, 2002

*Attest:*

*Attesting Officer*

JAMES E. ROGAN
*Director of the United States Patent and Trademark Office*